United States Patent
Miyazaki (10) Patent No.: US 7,471,809 B2
(45) Date of Patent: Dec. 30, 2008

(54) METHOD, APPARATUS, AND PROGRAM FOR PROCESSING STEREO IMAGE

(75) Inventor: Shinichi Miyazaki, Suwa (JP)

(73) Assignee: Seiko Epson Corporation (JP)

( * ) Notice: Subject to any disclaimer, the term of this patent is extended or adjusted under 35 U.S.C. 154(b) by 1101 days.

(21) Appl. No.: 10/769,739

(22) Filed: Jan. 30, 2004

(65) Prior Publication Data
US 2005/0008220 A1   Jan. 13, 2005

(30) Foreign Application Priority Data
Jan. 31, 2003   (JP)   ............................. 2003-023281

(51) Int. Cl.
*G06K 9/00*   (2006.01)
(52) U.S. Cl. .................................... 382/107
(58) Field of Classification Search ................ 382/107, 382/154, 236; 348/42–51, 59, 222.1
See application file for complete search history.

(56) References Cited

U.S. PATENT DOCUMENTS

| | | | |
|---|---|---|---|
| 4,745,562 A | 5/1988 | Prazdny | |
| 5,220,441 A | 6/1993 | Gerstenberger | |
| 5,557,323 A | 9/1996 | Kajiwara | |
| 6,021,209 A | 2/2000 | Hirabayashi et al. | |
| 6,163,337 A * | 12/2000 | Azuma et al. | 348/43 |
| 7,092,015 B1 * | 8/2006 | Sogawa | 348/222.1 |

FOREIGN PATENT DOCUMENTS

| | | |
|---|---|---|
| DE | 19623172 | 10/1997 |
| DE | 19732883 | 2/1998 |
| JP | 62-131381 | 6/1987 |
| JP | 07-103734 | 4/1995 |
| JP | 08-329110 | 12/1996 |
| JP | 09-079820 | 3/1997 |
| JP | 2000-020722 | 1/2000 |
| JP | 2001-092968 | 4/2001 |
| JP | 2001-116513 | 4/2001 |
| JP | 2001-141424 | 5/2001 |
| JP | 2001-351200 | 12/2001 |

* cited by examiner

*Primary Examiner*—Sherali Ishrat
(74) *Attorney, Agent, or Firm*—Harness, Dickey & Pierce, P.L.C.

(57) ABSTRACT

A method for processing a stereo image is provided which includes the steps of setting a specified area of a base window with reference to a point for obtaining a corresponding point in the base image; setting a reference window having the same size as that of the base window in the reference image; evaluating the difference between the base window and the reference window while scanning the reference window along an epipolar line; determining the position of the reference window having the minimum difference as a stereo corresponding point; measuring parallax from the difference between the position of the base window and the position of the reference window; calculating the reliability of the corresponding point (parallax) by first reliability based on the sharpness of the peak of the evaluation-value distribution of the difference of patterns between the base window and the reference window and second reliability based on the shape of the peaks; and outputting the value of the reliability of the parallax together with information on the parallax.

6 Claims, 10 Drawing Sheets

METHOD, APPARATUS, AND PROGRAM FOR PROCESSING STEREO IMAGE

BACKGROUND OF THE INVENTION

1. Technical Field of the Invention

The present invention relates to a method, an apparatus, and a program for processing a stereo image. More particularly, the invention relates to a method, an apparatus, and a program for processing a stereo image in which a correspondence search is made between two images captured by two imaging devices to measure the parallax in stereophonic matching for obtaining three-dimensional position coordinates of an observation object from a plurality of images observed from different viewpoints on the basis of the principle of triangulation by utilizing the known positional relationship of two or more cameras.

2. Description of the Related Art

When an object is measured from two different viewpoints, a point on the object is projected on different positions in the respective observation images. The difference of measured positions between the images is referred to as parallax. Finding the parallax allows calculation of three-dimensional position coordinates of the point on the basis of the principle of triangulation.

In order to determine the parallax by a correspondence search between stereo images, a block matching method is often used by which a small area (block) in one (left) image is observed, a block having a luminance distribution most similar (the maximum correlation) to that of the block is searched from the other (right) image, and the parallax is determined by the relative position between the blocks in both images having the maximum correlation.

In block matching, a position different from a true corresponding position sometimes has the largest correlation by the influence of noise or the like. In the above simple matching method, however, correlation distribution in the block search range is not taken into consideration, thus often causing mismatching to reduce the reliability of the accuracy of parallax measurement.

In order to solve the above problem, various methods have been provided to improve reliability. For example, the correlation distribution in the block search range is investigated, wherein when there is a plurality of blocks with close similarity, the parallax is not determined and is detected only for high-reliability parts (for example, refer to Japanese Unexamined Patent Application Publication No. 2001-351200 (FIG. 1)).

Another example is a method by which the distribution of the correlation is investigated to evaluate the reliability of correspondence by the degree of matching indicated by the sharpness of the peak, wherein for a low-reliability part, the parallax is corrected on the basis of the continuity of parallax with the peripheral pixels to obtain high-reliability detailed measurement, so that the measurement can effectively be corrected in such a case that the measured parallax becomes suddenly discontinuous by the influence of noise or the like (for example, refer to Japanese Unexamined Patent Application Publication No. 2001-116513 (FIG. 1)).

Another example is a method by which two patches with different sizes (a small patch and a large patch) are prepared, wherein the small patch is used to pick out two or more candidates of the corresponding point and then the large patch is used to obtain correlation only for the positions of the candidates of the corresponding point and the one with the highest correlation is determined as a corresponding point, thus reducing erroneous correspondence when two or more patterns similar to the patch are present (for example, refer to Japanese Unexamined Patent Application Publication No. 2001-141424 (FIG. 1)).

Another method of phase-in corresponding-point search is provided to reduce the processing time by which a correspondence search area is narrowed with a low-resolution image and then an accurate correspondence search is carried out with a high-resolution image (for example, refer to Japanese Unexamined Patent Application Publication No. 7-103734 (FIG. 1)).

However, the method described in Japanese Unexamined Patent Application Publication No. 2001-351200 has the problem of low-density distribution of measured data.

The method described in Japanese Unexamined Patent Application Publication No. 2001-116513 has the possibility of increasing erroneous measurement in part although providing seemingly high-reliability detailed measurement because the parallax is forcibly corrected on the basis of the continuity of the peripheral parallax. When there are two or more corresponding-point candidates having highly similar correlation such as a repetition pattern, the correlation with a block in a position different from a true corresponding position is sometimes stronger than that in the true corresponding position, whereas by the related-art method, actual reliability is disadvantageously low.

According to the method described in Japanese Unexamined Patent Application Publication No. 2001-141424, by which a block size is further increased depending on the result of matching to repeat matching in order to improve the reliability of correspondence search, the processing cost of repeating the comparison of blocks due to an increase in block size is increased, so that the process time for obtaining a result is disadvantageously increased.

According to the method described in Japanese Unexamined. Patent Application Publication No. 7-103734 (FIG. 1), by which a corresponding-point search is made in stages using a hierarchical image, when a correspondence detection result with a low-resolution image is in error, the accuracy cannot be increased even if the search is conducted with a high-resolution image. In other words, the accuracy depends on the correspondence detection result with a low-resolution image (search area in a high-resolution image). However, since detailed information is lost in the low-resolution image, it is hard to increase the matching reliability.

The present invention has been made in consideration of the above situations. Accordingly, it is an object of the invention to achieve a high-reliability stereo correspondence search in a short processing time.

SUMMARY

A method is provided for processing a stereo image which includes a method for measuring parallax by making a stereo-correspondence search between a base image taken with a first imaging device and a reference image taken with a second imaging device. The method includes the steps of: setting a specified area of a base window with reference to an object point for obtaining a corresponding point in the base image; setting a reference window having the same size as that of the base window in the reference image; evaluating the difference between the patterns of the base window and the reference window while scanning the reference window along an epipolar line in the reference image which corresponds to the object point; determining the position of the reference window having the minimum difference as a stereo corresponding point; measuring the parallax by the difference between the position of the base window and the position of the reference window when the stereo-corresponding point is determined; calculating the reliability of the parallax by first reliability based on the sharpness of the peak of the evaluation-value distribution of the difference of patterns between the base window and the reference window obtained by scanning the reference window and second reliability based on the shape of the peaks; and outputting the value of the reliability of the parallax together with the value of the parallax. This allows the possibility of mismatching to be grasped more accurately and provides more detailed measurement.

Preferably, the inter-frame difference between the frame processed immediately before and the current frame is calculated in the base image; a stereo correspondence search is made only for a changed area determined to be changed between the frames and an unsearched area; and a stereo-correspondence search result until immediately before is outputted for an unchanged and searched area. This allows processing time to be reduced with high reliability.

Preferably, for the area with lower reliability of parallax than a specified value among the unchanged and searched area, the sizes of the base window and the reference window during the stereo-correspondence search are enlarged; the stereo-correspondence search is repeated continuously following the stereo-correspondence search of the changed-area and the unsearched area; and, as a result, when the reliability is improved, the information on the parallax of the area and its reliability is updated. This allows the reduction of a decrease in measurement accuracy due to mismatching. This also allows the time for obtaining necessary results to be reduced, thus reducing the processing time with high reliability, while ensuring the reliability.

Preferably, the search-starting-position coordinates in the reference image which corresponds to each pixel in the base image are calculated in advance on the basis of the tilt angles of the optical axes of the first imaging device and the second imaging device; the correspondence relationship between the position coordinates of each pixel in the base image and the search-starting-position coordinates in the reference image which corresponds to each pixel in the base image is held as a table; and a stereo-correspondence search can be made from a search starting position in the reference image which is obtained by referencing the table. This allows efficient searching and improves the reliability of matching.

A stereo-image processing apparatus is an apparatus for measuring parallax by making a stereo-correspondence search between a base image taken with a first imaging device and a reference image taken with a second imaging device. The apparatus includes: first setting means for setting a specified area of base window with reference to an object point for obtaining a corresponding point in the base image; second setting means for setting a reference window having the same size as that of the base window in the reference image; evaluation means for evaluating the difference between the patterns of the base window and the reference window while scanning the reference window along an epipolar line in the reference image which corresponds to the object point; determination means for determining the position of the reference window having the minimum difference as a stereo corresponding point; measurement means for measuring the parallax by the difference between the position of the base window and the position of the reference window when the stereo-corresponding point is determined; calculation means for calculating the reliability of the parallax by first reliability based on the sharpness of the peak of the evaluation-value distribution of the difference of patterns between the base window and the reference window obtained by scanning the reference window and second reliability based on the shape of the peaks; and output means for outputting the value of the reliability of the parallax together with the value of the parallax. This allows the possibility of mismatching to be grasped more accurately and provides more detailed measurement.

A program for processing a stereo image is a program for controlling a stereo-image processing apparatus for measuring parallax by making a stereo-correspondence search between a base image taken with a first imaging device and a reference image taken with a second imaging device. The program allows the stereo-image processing apparatus to execute the steps of: setting a specified area of base window with reference to an object point for obtaining a corresponding point in the base image; setting a reference window having the same size as that of the base window in the reference image; evaluating the difference between the patterns of the base window and the reference window while scanning the reference window along an epipolar line in the reference image which corresponds to the object point; determining the position of the reference window having the minimum difference as a stereo corresponding point; measuring the parallax by the difference between the position of the base window and the position of the reference window when the stereo-corresponding point is determined; calculating the reliability of the parallax by first reliability based on the sharpness of the peak of the evaluation-value distribution of the difference of patterns between the base window and the reference window obtained by scanning the reference window and second reliability based on the shape of the peaks; and outputting the value of the reliability of the parallax together with the value of the parallax. This allows the possibility of mismatching to be grasped more accurately and provides more detailed measurement.

DETAILED DESCRIPTION

Figure 1:
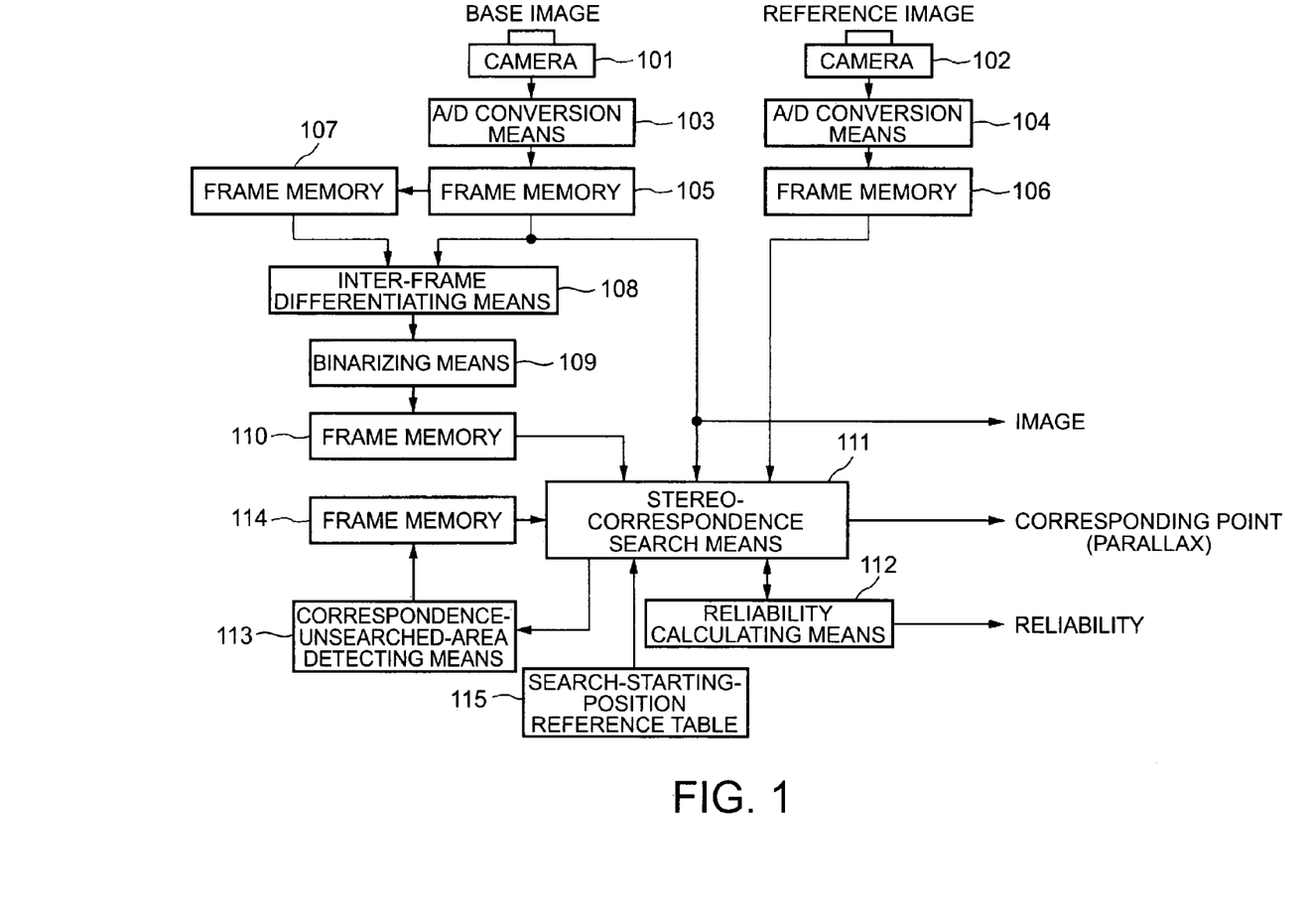
FIG. 1 is a block diagram of a stereo-image processing apparatus according to an embodiment of the present invention.

FIG. 1 is a block diagram of an example of an apparatus for implementing a stereo-image processing method according to the present invention. The arrangement of a stereo-image processing apparatus according to an embodiment of the invention will be described hereinafter with reference to FIG. 1.

Referring to FIG. 1, numerals 101 and 102 denote stereo cameras for simultaneously imaging an object from different points of view. The camera 101 picks up a base image for a stereo correspondence search. The camera 102 picks up a reference image for searching for a point corresponding to a point in the base image taken with the camera 101. Numerals 103 and 104 denote A/D conversion means for converting analog signals outputted from the cameras 101 and 102 to digital signals, respectively. Many new cameras have an A/D converter built-in to output digital signals and, in such a case, there is no need to use the A/D converters 103 and 104.

Frame memories 105 and 106 store the base image and the reference image, respectively. A frame memory 107 stores the contents of the frame memory 105 (base image) of the image frame (immediately preceding frame) processed just before the current image frame. An inter-frame differentiating means 108 operates on the difference between the contents (gray scale image) of the frame memory 105 and the contents (gray scale image) of the frame memory 107 to thereby output an inter-frame difference image of the base image.

A binarizing means 109 binarizes the inter-frame difference image with a specified threshold value and a frame memory 110 stores the binary image. The contents of the frame memory 110 has a value of 1 in the area with a change to a gray scale value depending on the camera conditions and the movement of the object and a value 0 in the area with no change including a static part. A stereo-correspondence search means 111 searches the reference image (the frame memory 106) for a point that corresponds most to an object point in the base image (the frame memory 105).

Figure 2:
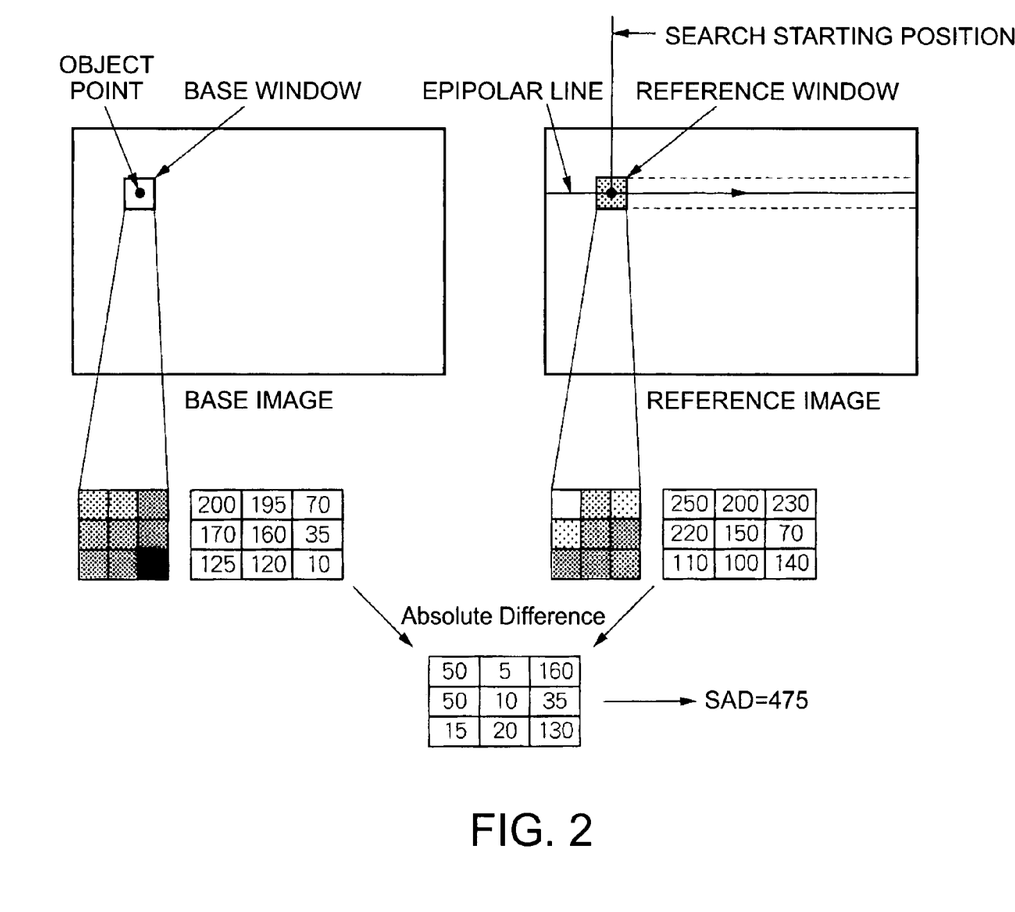
FIG. 2 is a diagram for explaining a method for correspondence searching.

FIG. 2 shows a method of searching for a corresponding point. The method for correspondence searching will be described with reference to FIG. 2. As shown in FIG. 2, the point for correspondence-searching in the base image is set as an object point and a specified area of a window (base window) is set with the object point as the center. A window (reference window) having the same size as that of the base window is set in the reference image such that the central point of the reference window agrees with the search starting position in the reference image.

Figure 3:
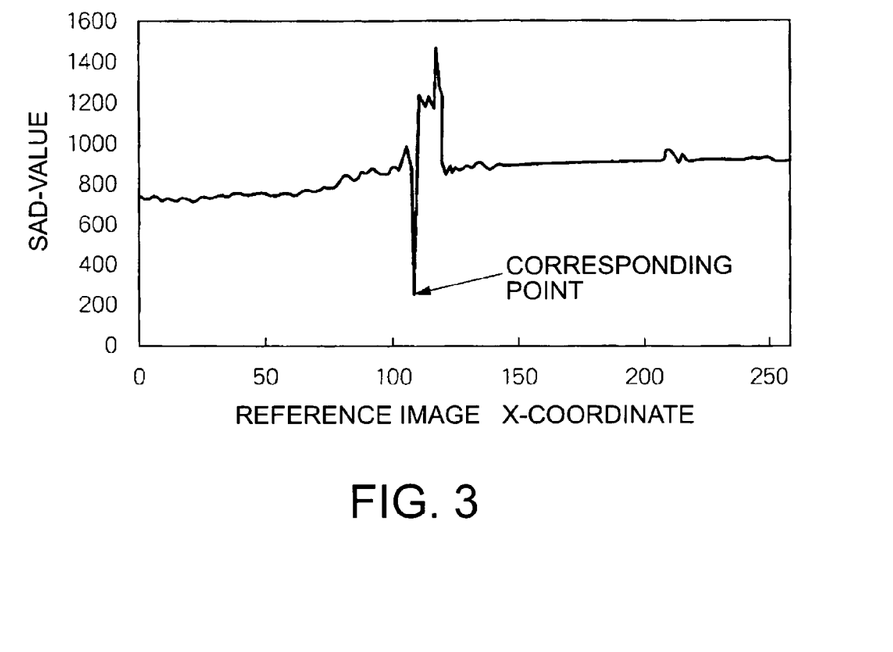
FIG. 3 is a diagram of an example of SAD-value distribution.

Subsequently, the difference between the patterns of the base window and the reference window is evaluated while scanning the reference window along an epipolar line in the reference image, which corresponds to the object point. Referring to FIG. 3, the position of the window in the reference image at which the difference is the minimum is determined as a corresponding point. Here the sum of absolute difference (SAD) in luminance of each pixel in the window is used as an evaluation function. FIG. 3 is an example of a graph of the distribution of SAD-values along the epipolar line, plotting the SAD-values in ordinate and the x-coordinate of the reference image (horizontal coordinate of the image) in abscissa. Of course, the evaluation function may also be the square sum of luminance differences.

Figure 4:
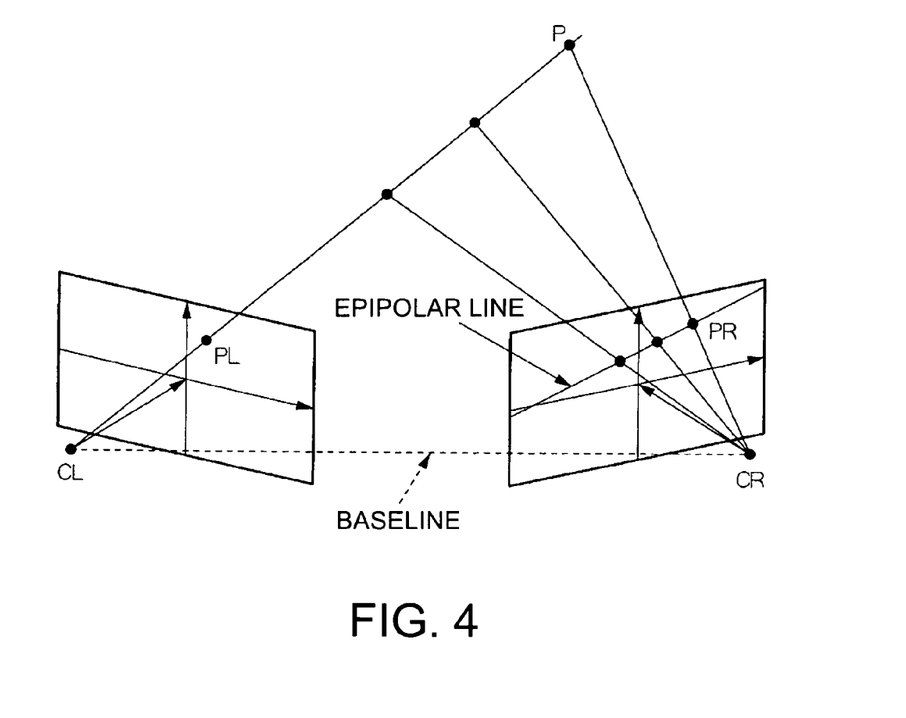
FIG. 4 is a diagram for explaining an epipolar constraining condition in stereo matching.

Stereo matching is a method for obtaining three-dimensional position coordinates with the principle of triangulation, utilizing a known arrangement relationship among two or more cameras. Referring to FIG. 4, when point P in space is detected as point PL in the left image by a stereo camera (for example, a base image taken with the camera 101), point PR corresponding to the point PL in the right image (for example, a reference image taken with the camera 102) has the following constraining condition:

Letting CL and CR be the optical centers of the cameras (for example, the cameras 101 and 102), point PR (a projected point of the point P onto the right image) corresponding to the point PL (a projected point of the point P to the left image) in the right image must be present somewhere on the intersection between the plane (epipolar plane) formed by the three points (CL-CR-PL) and the plane of the right image. The constraining condition is called the epipolar constraint and the above-mentioned intersection is called an epipolar line. In other words, the epipolar constraint condition indicates that it is sufficient to perform the correspondence search only on the epipolar line.

FIG. 2 shows an example of a simple structure of the stereo matching, wherein two cameras having an equal focal length are arranged such that the optical axes are parallel with each other and their image planes are on the same plane and wherein the straight line (baseline) connecting the optical centers of the left and right cameras is parallel to the horizontal axis of the image. Such a camera layout is called a parallel optical-axis system. In the parallel optical-axis system, the vertical axis coordinates of the projected points of the point in space onto the left and right images are equal. Accordingly, the epipolar line is present on the same scanning line. Therefore, it is sufficient to search the same scanning line for the corresponding point.

Furthermore, there is necessarily no need to check all pixels on the epipolar line for searching the corresponding point; it is sometimes sufficient to search a limited search range on the epipolar line.

Figure 5:
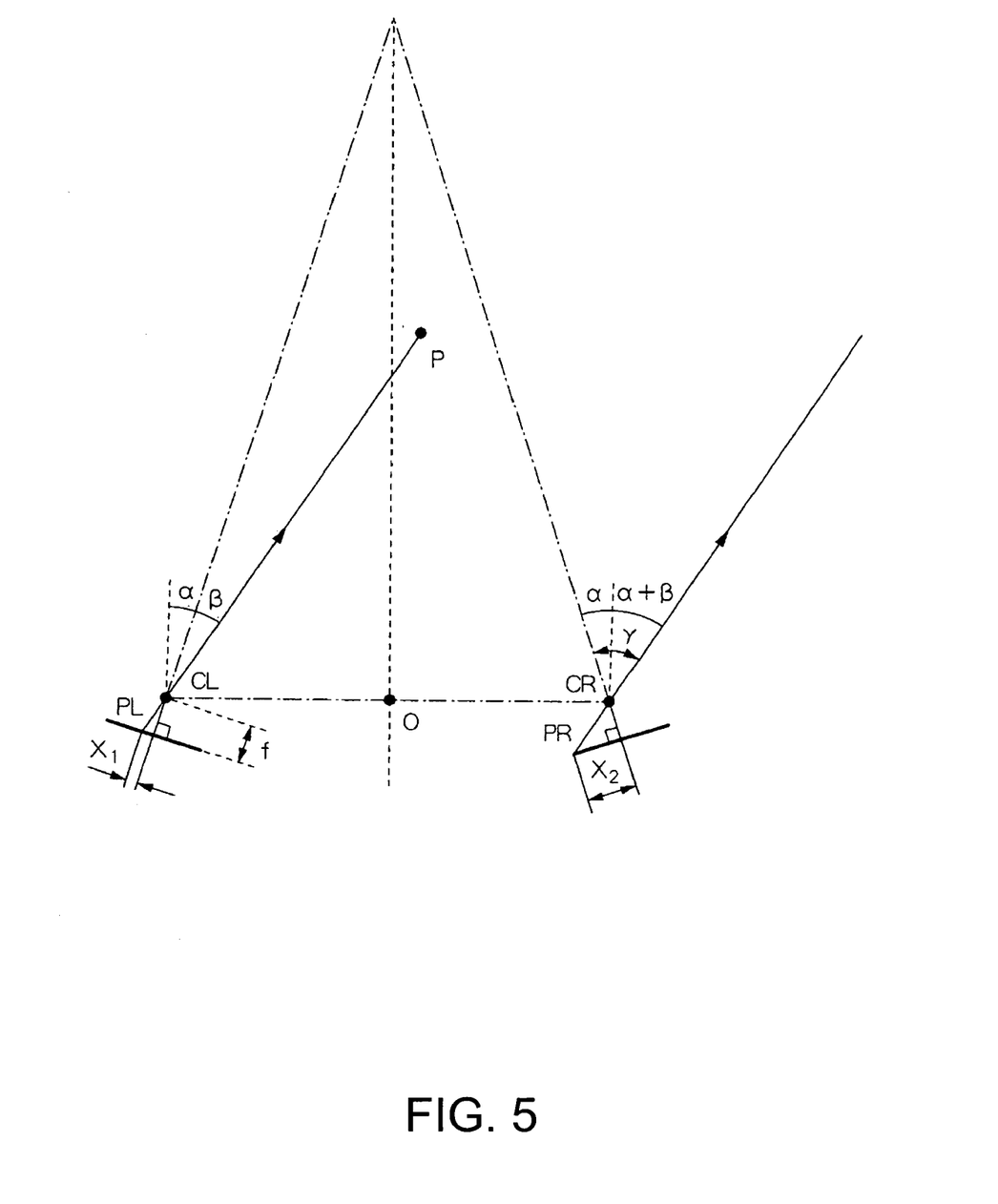
FIG. 5 shows a stereo-correspondence-search starting position in an intersecting optical-axes system.

FIG. 5 is a schematic plan view of an optical system in which the optical axes of the left and right cameras are each inclined inwardly at an angle α (intersecting optical-axes system), viewed vertically from above, showing a stereo-correspondence-search starting position in the intersecting optical-axes system. The focal distances of the cameras are all the same (f). Let point P in space be detected as projected point PL in the left image. At that time, assuming that point P is at infinity, then the projected point of the point P onto the right image is point PR at which the line parallel to line CL-PL that connects the left optical center CL and point PL and is drawn through the right optical center CR intersects the right image plane. Therefore, in the case of FIG. 5, point P does not detect in the left-side area of point PR; accordingly, in order to carry out a correspondence search in the right image, it is sufficient to make a search rightward along the epipolar line with point PR as a search starting point.

In FIG. 5, assuming that the left image is a base image, the search starting position in the right image, or a reference image, is on an epipolar line having a coordinate $X_2$ (horizontal axis coordinate) given by equation (1).

$$x_2 = \frac{x_1 + f \cdot \tan 2\alpha}{1 - \frac{x_1}{f} \tan 2\alpha} \qquad \text{Equation (1)}$$

where $x_1$: the x-coordinate of a matching window in the base image, where the origin of the coordinate is located in the optical center.

$x_2$: the x-coordinate of a search starting position in the reference image, where the origin of the coordinate is located in the optical center and the value of $x_2$ is limited in the range of the reference image frame.

f: the focal distance of cameras, where the base camera and the reference camera have an equal focal distance.

α: optical-axis tilt angle.

Figure 6:
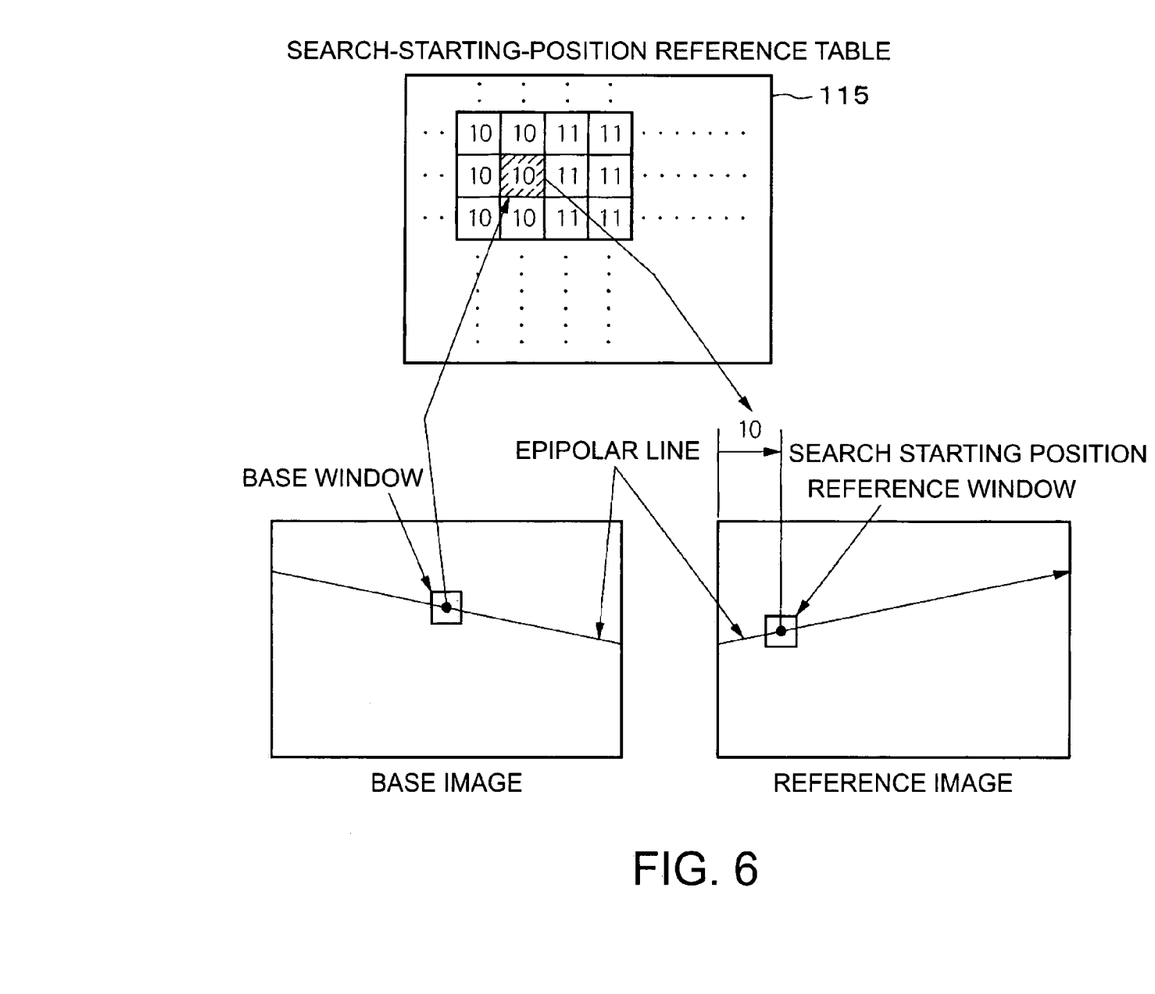
FIG. 6 is a corresponding-point-search-starting-position reference table.

Thus, the search starting position $x_2$ corresponding to each pixel of the base image is obtained from the optical-axis tilt angle α of the camera and the correspondence relationship is held as a search-starting-position reference table 115 (refer to FIG. 1), shown in FIG. 6, so that an efficient search can be carried out. This also improves the reliability of matching.

The two cameras 101 and 102 have an equal focal distance and parallel optical axes, the line connecting the optical centers is parallel with the horizontal axis of the image plane, and in the case of a parallel optical-axes system in which image planes are arranged on the same plane, α is defined as α=0, so that $x_2=x_1$ is given by equation (1). In other words, the search starting position agrees with the position of the matching window in the base image. This case does not need the above calculation in particular.

As described above, the corresponding-point search range is changed from two-dimensional space to limit one-dimensional space on the epipolar line and is further limited in the one-dimensional space, so that efficient corresponding-point searching can be achieved.

In this way, the corresponding point in the reference image, which corresponds to the object point in the base image can be obtained through the use of the stereo-correspondence search means 111.

Figure 7:
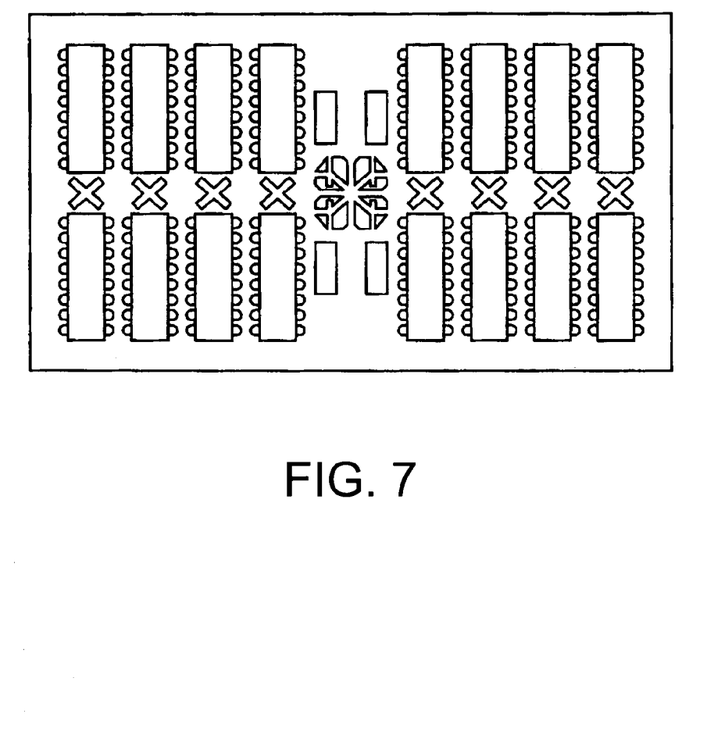
FIG. 7 shows an example of a stripe regular image.
Figure 8:
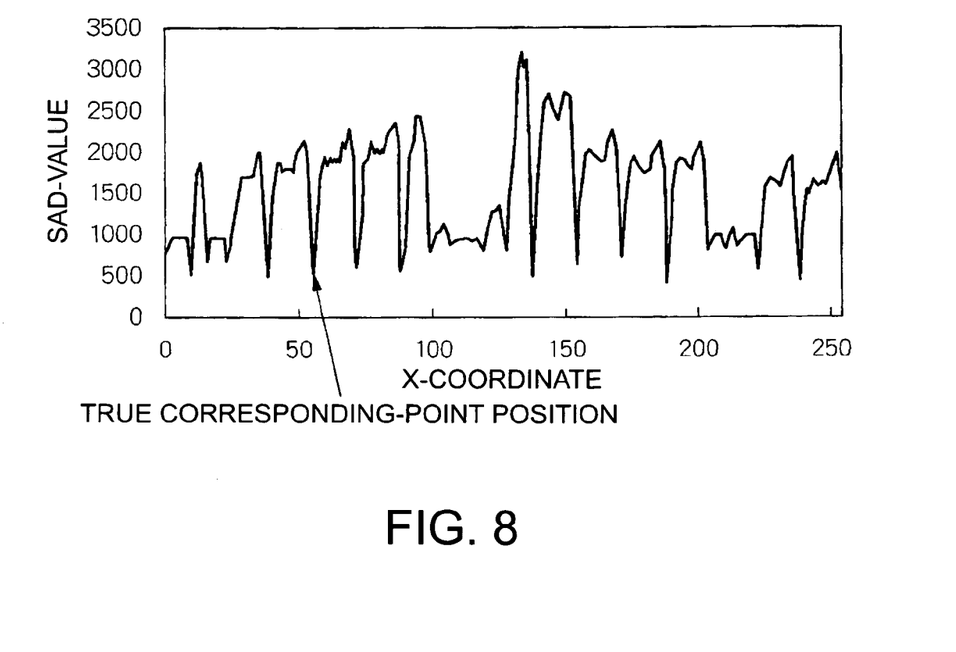
FIG. 8 shows an example of SAD-value distribution in a stripe regular stereo image.

As described above, the distribution of SAD-values is obtained along the epipolar line in the reference image which corresponds to the object points in the base image, and the position of the window in the reference image, which has the minimum SAD-value, is detected as a corresponding point. In comparison, by block matching, a uniform pattern with less gray change shows no clear pattern in SAD-value distribution. As shown in FIG. 7, when a plurality of similar patterns is present, the SAD-value distribution exhibits clear peaks, as shown in FIG. 8; however, since the peaks have similar values, it is difficult to determine which peak (parallax) should be selected. FIG. 7 shows an example of a stripe regular image. FIG. 8 is a graph of an example of an SAD-value distribution in the stripe regular stereo image.

In this embodiment, the reliability of information on the corresponding points obtained by the stereo-correspondence search means 111 is obtained by a reliability calculating means 112. Here, the reliability of parallax is obtained on the basis of two reliabilities. First reliability is based on the sharpness of the SAD-value distribution. The higher the sharpness, the higher the reliability.

The first reliability $R_1$ can be given by equation (2), for example.

$$R_1 = \frac{a \times d(\min)}{T_1 - p(\min)} \qquad \text{Equation (2)}$$

where, d(min): differential absolute value in the minimum SAD-value $T_1$: threshold value p(min): the minimum SAD-value a: constant where if the value of $R_1$ is larger than 1, $R_1$ is set to 1.

Second reliability $R_2$ is based on the shape of peaks. When only one peak (a peak in the minimum SAD-value) is present, the reliability is 1 (100 percent) and as the number of peaks close to the minimum SAD-value increases, the value of $R_2$ decreases. The second reliability $R_2$ is given by equation (3), for example.

$$R_2 = \frac{1}{\sum \left(\frac{p(\min)}{p(i)}\right)^n} \qquad \text{Equation (3)}$$

where, p(i): an SAD-value in the $i^{th}$ peak p(min): the minimum SAD-value n: a natural number Finally, the reliability R of the correspondence of the object point can be given by equation (4).

$$R=R_1 \times R_2 (0 \leq R \leq 1) \qquad \text{Equation (4)}$$

A correspondence-unsearched-area detecting means 113 assigns value 1 to an area (pixel) where correspondence searching by the stereo-correspondence search means 111 has been completed and value 0 to an unsearched area (pixel) and stores them in a frame memory 114. The content of the frame memory 114 is updated as needed in accordance with correspondence-search proceedings.

Into the stereo-correspondence search means 111, information on the area where a gray area scale value has changed is inputted from the frame memory 110 and also information on the area where stereo correspondence has not yet searched is inputted from the frame memory 114 so that an efficient search can be made with priority to the changed area or the correspondence-unsearched area. The reliability of corresponding points is inputted from the reliability calculating means 112 so that correspondence searching is repeated while the size of the window during the correspondence search is varied depending on the reliability.

Figure 9:
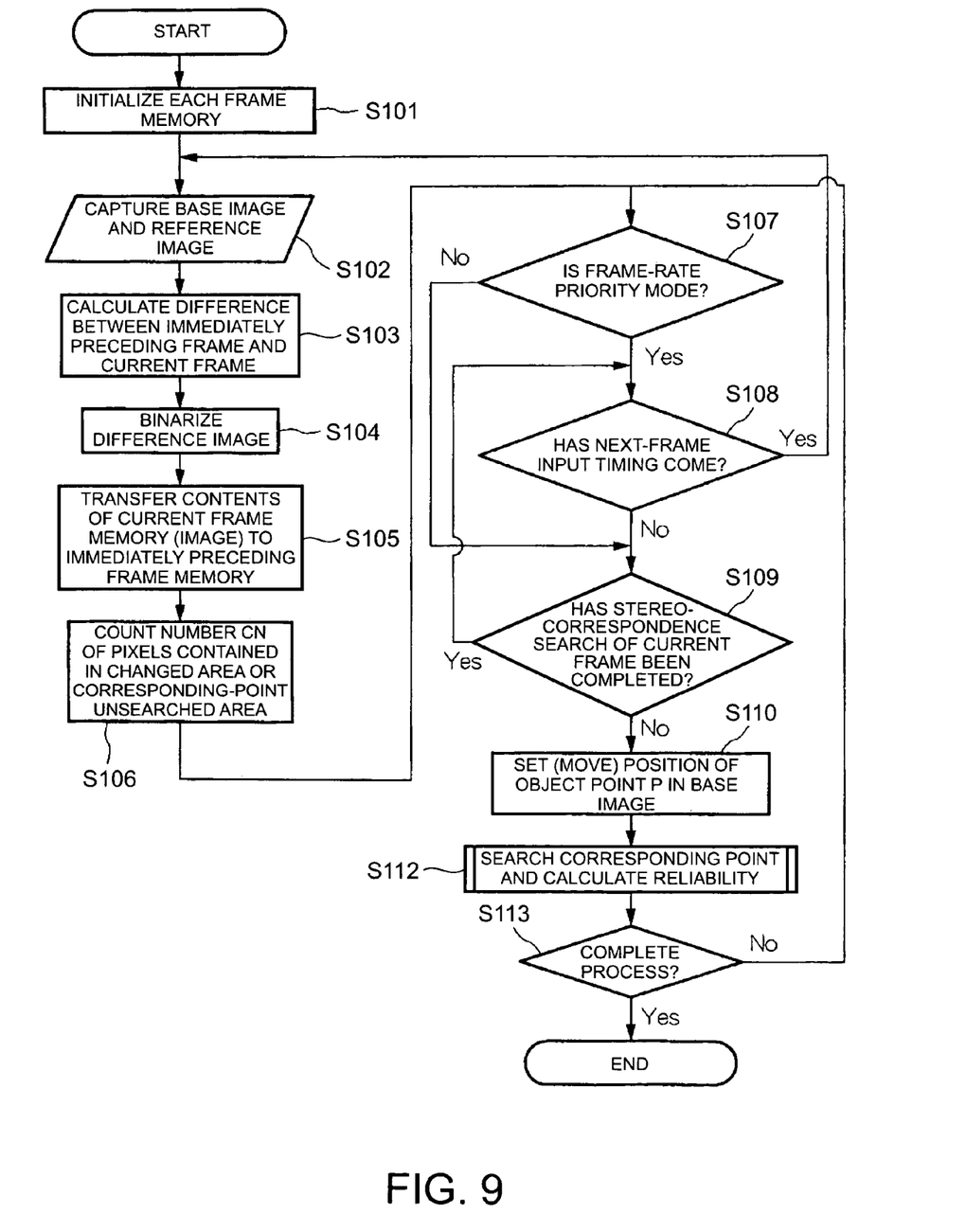
FIG. 9 is a flowchart for a main process.
Figure 10:
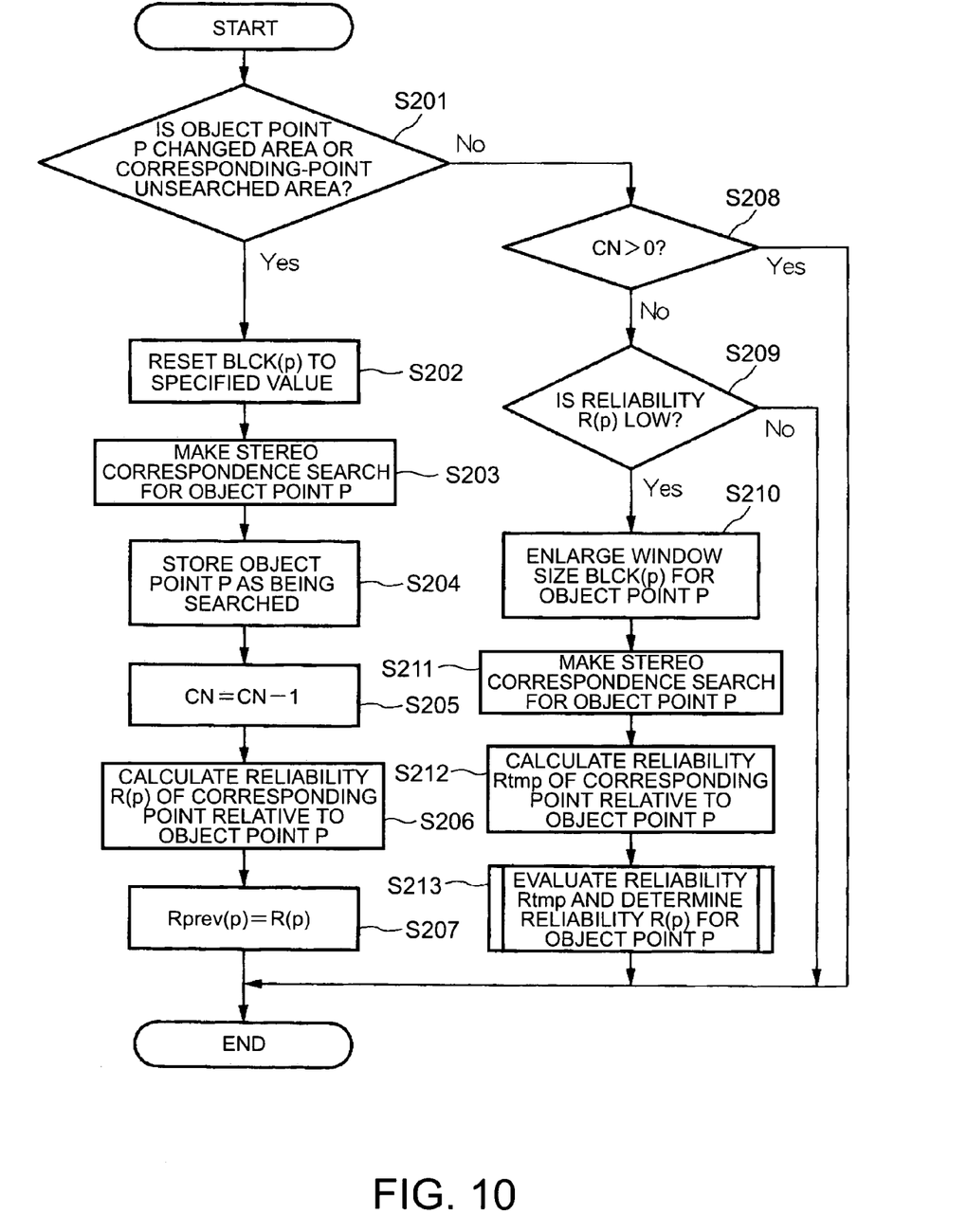
FIG. 10 is a flowchart for a stereo-correspondence search and reliability-calculating process.
Figure 11:
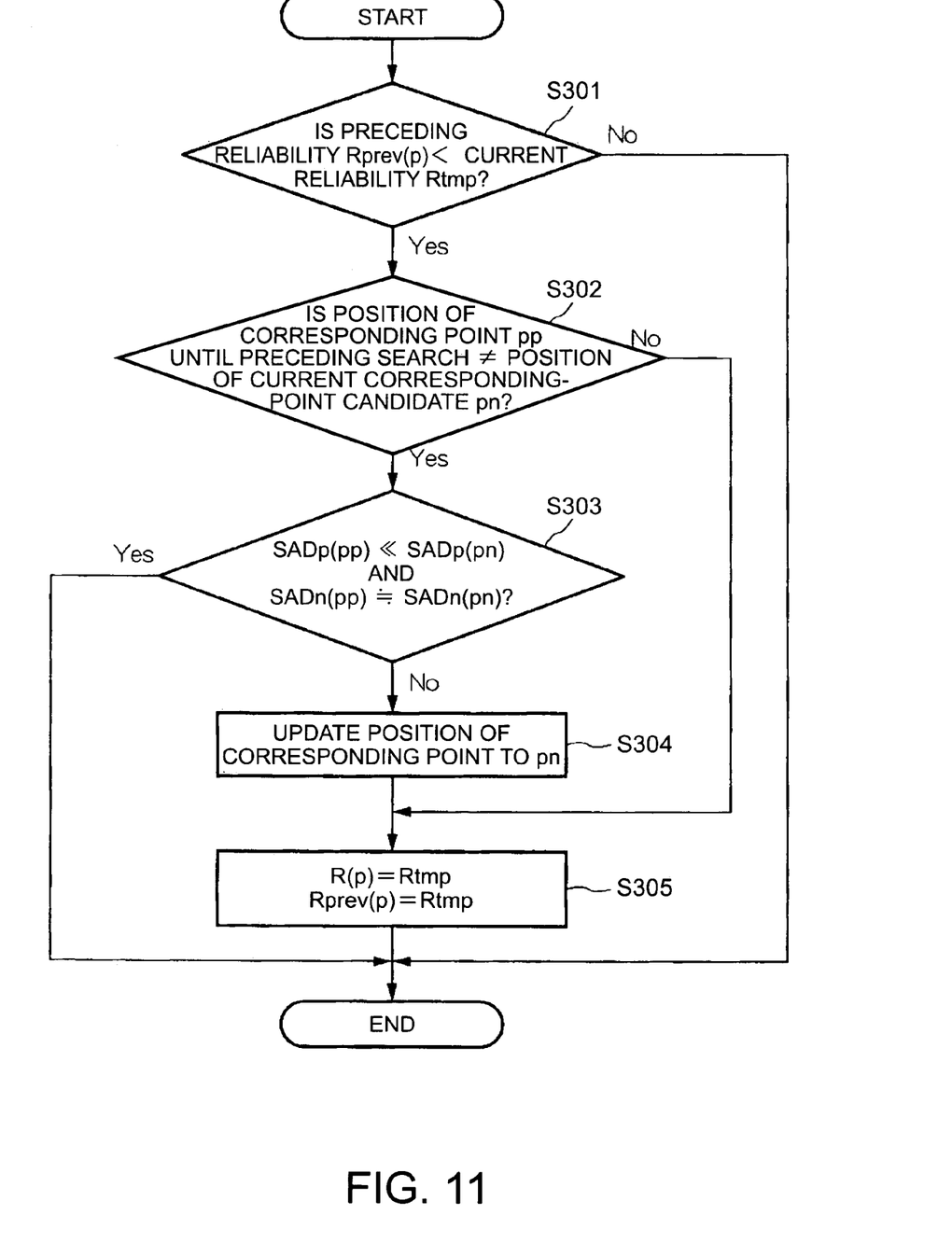
FIG. 11 is a flowchart for a reliability-evaluation and corresponding-point determination process.

Referring to the flowcharts of FIGS. 9 to 11, the operation of the embodiment will be specifically described. FIG. 9 shows an example of a main processing step according to the embodiment. In step S101 of FIG. 9, the contents of the frame memories 105, 106, 107, 110, and 114, shown in FIG. 1, are initialized.

In step S102, the base image and the reference image are captured from the cameras 101 and 102 into the frame memories 105 and 106, respectively. Then, in step S103, inter-frame differentiation is made between the frame immediately preceding the base image stored in the frame memory 107 and the current frame of the base image stored in the frame memory 105 by the inter-frame differentiating means 108. The difference image thereby obtained is binarized by the binarizing means 109 (step S104) and the binary image is stored in the frame memory 110.

Then, in step S105, the contents in the frame memory 105, or the contents of the current base image, are transferred to the frame memory 107. The binary image in the frame memory 110 is assigned value 1 only in the changed area between the current and the immediately preceding frames and value 0 for the unchanged area, so that the changed area in the image can be extracted. In step S106, the number CN of pixels contained in the changed area or the correspondence-unsearched area in the base image is counted by the stereo-correspondence search means 111 with reference to the contents of the frame memory 110 and the contents of the frame memory 114, which will be described later.

In step S107, the process mode of the embodiment is determined, wherein when the process is in a frame-rate priority mode, the process moves from step S107 to step S108 and, when not in the frame-rate priority mode (when in the mode in which the completion of correspondence search is given a higher priority), the process moves from step S107 to step S109.

In step S108, it is determined whether the time for inputting the next image frame has come, wherein when at the input time, the process returns to step S102 wherein the base image and the reference image are captured. When it is not at the input time, the process moves to step S109. Then, in step S109, it is determined whether stereo-correspondence searching of the current frame has been completed, wherein when the search has been completed, the process returns to step S108 to wait for the time of inputting the next frame and, when the search has not been completed, the process moves tp step S110.

In step S110, object point P for searching for a corresponding point is set in the base image. When it is immediately after the activation of the apparatus, the position of point P is set, for example, at the left upper corner of the base image and is raster-scanned (moved) by the following repeated searches. The process then moves to step S112, wherein a corresponding point in the reference image, which corresponds to object point P of the base image is searched for by the stereo-correspondence search means 111.

In step S112, at the same time, the reliability of correspondence is calculated by the reliability calculating means 112, wherein its value is outputted and, for the area with low reliability, the correspondence search is repeated again with the size of the search window changed. The details of step S112 will be described later.

The process then moves to step S113, wherein when a process-end instruction is given, the process is completed and, when a process-continuation instruction is given, the process returns to step S107 and the processes of step S107 to S113 are repeated.

The stereo-correspondence search and reliability-calculation process of step S112 will be specifically described with reference to the flowchart of FIG. 10. Upon starting step S112, it is first checked in step S201 of FIG. 10 whether object point P in the base image is the changed area or the area where the corresponding point has not yet been searched for.

In this step, it can be determined whether it is the changed area by investigating the value of the frame memory 110 (refer to FIG. 1) in the area. The frame memory 114 (refer to FIG. 1) has an arrangement similar to that of frame memory 110 wherein, for example, value 1 is set for the area (pixel) where the corresponding point has not yet been searched for and value 0 is set for the searched area.

Therefore, it can be determined whether the corresponding point has been searched for by investigating the value of the frame memory 114. When it has been determined in step S201 that object point P is the changed area or the correspondence-unsearched area, the process moves to step S202, wherein the correspondence-search window size BLCK(p) for object point P is reset to a specified value.

The process moves to step S203 wherein the stereo correspondence search for object point P is made. Since the method for the stereo correspondence search has already been described, its description is omitted here.

The process moves to step S204 wherein the value of the frame memory 114 for object point P is updated (set to value 0) with P as having already been searched for stereo correspondence. The process moves to step S205 wherein the number CN of pixels contained in the changed area or the correspondence-unsearched area is decremented.

The process moves to step S206 wherein the reliability R(p) of the corresponding point in the reference image relative to object point P, or the reliability R(p) of the parallax is calculated. Since a specific example of calculation of reliability R has been described, its description is omitted here. The process moves to step S207 wherein R(p) is substituted to Rprev(p) for storing the reliability of the result of preceding correspondence search in object point P. The stereo-correspondence search and reliability-calculation process (step S112) is thus completed.

On the other hand, in step S201, when a negative determination is made, or it is determined that object point P is not the changed area but the correspondence searched area, the process moves from step S201 to step S208. In step S208, when the value CN of pixels in the changed area or the correspondence-unsearched area is larger than 0, the stereo-correspondence search and reliability-calculation process (step S112) for object point P is completed.

By contrast, when the value of CN is equal to 0, or there is no area to be searched, the process moves to step S209. In step S209, the value of the reliability R(p) of the point corresponding to object point P is determined, wherein when the reliability is low, the process proceeds to step S210 and, when the reliability is high, the stereo-correspondence search and reliability-calculation process (step S112) is completed.

In step S210, the value of correspondence-search window size BLCK(p) for object point P is further increased and the correspondence search is made again (step S211). BLCK is held in correspondence to each pixel of the base image by the stereo-correspondence search means 111 of FIG. 1. All the values of BLCK corresponding to pixels are reset to a specified value immediately after activation. The process then moves to step S212. In step S212, the reliability Rtmp of the point corresponding to object point p after the corresponding-point research is calculated.

The process moves to step S213 wherein the reliability Rtmp obtained in step S212 is evaluated; thus, the reliability R(p) for object point p is determined. Then the stereo-correspondence search and reliability-calculation process is completed (step S112). In this way, the changed area and the correspondence-unsearched area are first processed with priority and then the searched area with low reliability is searched again.

Referring to the flowchart of FIG. 11, the process of evaluating the reliability in step S213 of FIG. 10 will be specifically described. Upon starting step S213, a comparison is made in step S301 of the flowchart of FIG. 11 between the reliability Rprev(p) of the preceding correspondence search result and the reliability Rtmp of the current correspondence search result for object point P. Rprev is held in correspondence to each pixel of the base image by the reliability calculating means 112 of FIG. 1.

Immediately after activation, all the values of Rprev corresponding to pixels are reset to 0. When the current reliability Rtmp is higher than the preceding Rprev(p), the process moves from step S301 to step S302. In contrast, when Rtmp is smaller than or equal to Rprev(p), the process is completed.

In step S302, a comparison is made between the position of point pp corresponding to object point P, which has been obtained by the previous correspondence searches and the position of corresponding-point candidate pn by the current correspondence search. When both are different from each other, the process moves to step S303. In contrast, when both are equal, the process moves to step S305.

Figure 12:
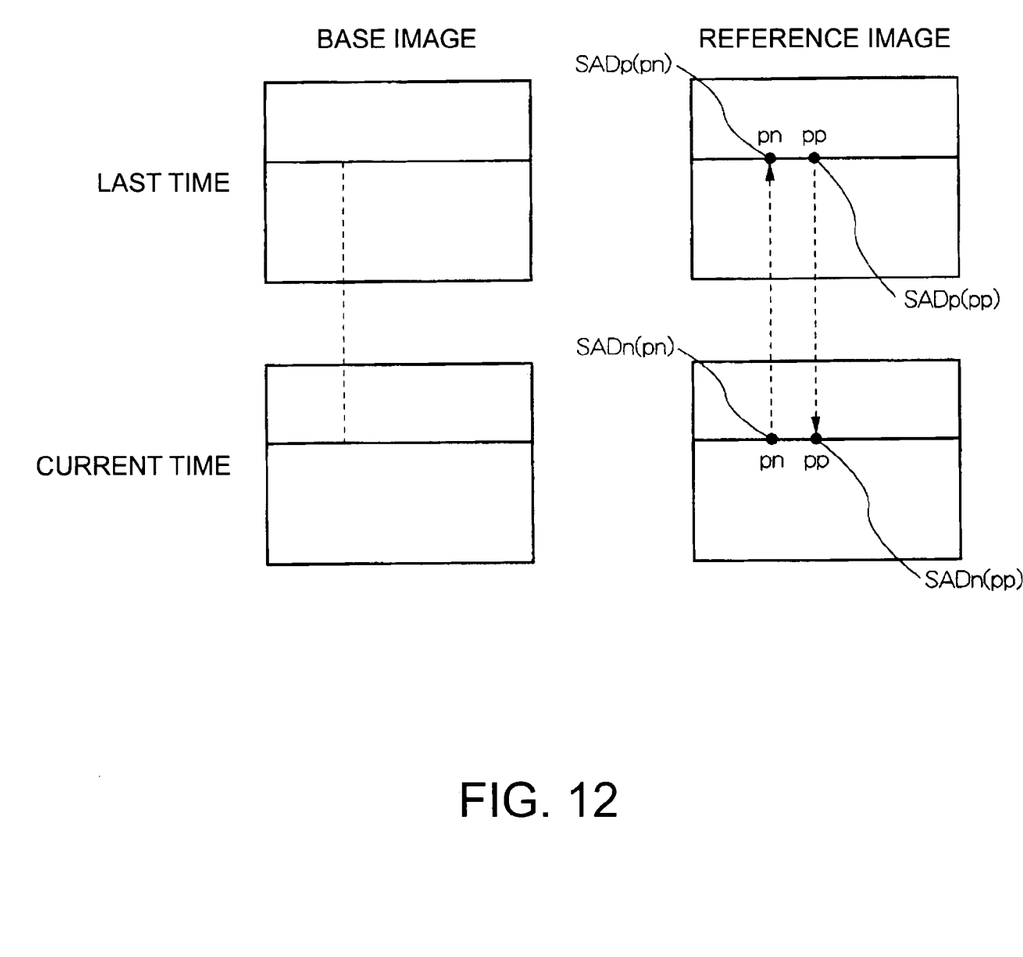
FIG. 12 shows the positions and SAD-values of the preceding and the current corresponding points and corresponding-point candidates.

In step S303, as shown in FIG. 12, when the SAD-value SADp(pn) in the preceding correspondence search at the position of the corresponding-point candidate pn is sufficiently larger than the preceding SAD-value SADp(pp) at the position of the corresponding point pp and also the difference between the current SAD-value SADn(pp) of the corresponding point pp and the current SAD-value SADn(pn) of the corresponding-point candidate pn is small, the reliability-evaluation process is completed as the position pp of the corresponding point being unchanged. If not, the process moves to step S304 wherein the position of the corresponding point is updated from pp to pn and the process moves to step S305.

In step S305, the Rtmp is substituted into the correspondence reliability R(p) of object point P, so that the reliability is determined. Also the value of the preceding reliability Rprev(p) is updated by the current reliability Rtmp. The reliability evaluation process is thus completed.

As described above, according to the embodiment, the reliability of the corresponding point, or the parallax, is calculated by the first reliability based on the sharpness of the peak of the evaluation-value distribution of the difference between the patterns of the base window and the reference window and by the second reliability based on the shape of the peaks. Therefore, possible mismatching can be grasped more accurately. Also, since repeated searches are made with the search condition (window size) being varied depending on the reliability, a decrease in measurement accuracy due to mismatching can be reduced and more detailed measurement can be given.

Since the reliability of the corresponding point (parallax) is outputted together with the information on the corresponding point (parallax), the process can be put in order of priority also in a higher-level apparatus such as an image-recognition processor utilizing the output of this embodiment, allowing efficient processing as a system.

Since the changed area and the correspondence-unsearched area in the image are first processed with priority and then the searched area with low reliability is searched again, the time to obtain a necessary result can be reduced, thereby reducing processing time while ensuring reliability.

The search starting position corresponding to each pixel of the base image is obtained in advance from the tilt angle of the optical axes of the cameras and the correspondence relationship is held as a search-starting-position reference table, so that an efficient search can be carried out. Also the reliability of matching can be improved.

It should be understood that the arrangement and operation of the embodiment are preferred and yet various modifications may be made without departing from the spirit and scope of the invention.

The entire disclosure of Japanese Patent Application No. 2003-023281 filed Jan. 31, 2003 is incorporated by reference.

What is claimed is:

1. A method for processing a stereo image, for measuring parallax by making a stereo-correspondence search between a base image taken with a first imaging device and a reference image taken with a second imaging device, comprising the steps of:
    setting a specified area of a base window with reference to an object point for obtaining a corresponding point in the base image;
    setting a reference window having a same size as that of the base window in the reference image;
    evaluating a difference between patterns of the base window and the reference window while scanning the reference window along an epipolar line in the reference image which corresponds to the object point;
    determining a position of the reference window having a minimum difference as a stereo corresponding point;
    measuring the parallax by a difference between a position of the base window and a position of the reference window when the stereo-corresponding point is determined;
    calculating a reliability of the parallax by first reliability based on a sharpness of a peak of an evaluation-value distribution of the difference of patterns between the base window and the reference window obtained by scanning the reference window and second reliability based on a shape of the peaks; and
    outputting a value of the reliability of the parallax together with a value of the parallax.

2. The method for processing a stereo image according to claim 1, further comprising the steps of:
    calculating an inter-frame difference between a frame processed immediately before and a current frame in the base image;
    making a stereo correspondence search only for a changed area determined to be changed between the frames and an unsearched area; and
    outputting an immediately preceding stereo-correspondence search result for an unchanged and searched area.

3. The method for processing a stereo image according to claim 1, further comprising the steps of:
    enlarging a size of the base window and the reference window during the stereo-correspondence search, for the area with lower reliability of parallax than a specified value among the unchanged and searched area;
    repeating the stereo-correspondence search continuously following the stereo-correspondence search of the changed-area and the unsearched area; and
    updating information on the parallax of the area and the reliability of the parallax when the reliability is improved.

4. The method for processing a stereo image according to claim 1, further comprising the steps of:
    calculating the search-starting-position coordinates in the reference image which corresponds to each pixel in the base image, in advance, on the basis of tilt angles of optical axes of the first imaging device and the second imaging device;
    holding a correspondence relationship between the position coordinates of each pixel in the base image and the search-starting-position coordinates in the reference image which correspond to each pixel in the base image as a table; and
    making a stereo-correspondence search from a search starting position in the reference image which is obtained by referencing the table.

5. A stereo-image processing apparatus for measuring parallax by making a stereo-correspondence search between a base image taken with a first imaging device and a reference image taken with a second imaging device, comprising:
    first setting means for setting a specified area of a base window with reference to an object point for obtaining a corresponding point in the base image;
    second setting means for setting a reference window having the same size as that of the base window in the reference image;
    evaluation means for evaluating a difference between patterns of the base window and the reference window while scanning the reference window along an epipolar line in the reference image which corresponds to the object point;
    determination means for determining a position of the reference window having a minimum difference as a stereo corresponding point;

measurement means for measuring the parallax by a difference between a position of the base window and a position of the reference window when the stereo-corresponding point is determined;

calculation means for calculating a reliability of the parallax by first reliability based on a sharpness of a peak of an evaluation-value distribution of the difference of patterns between the base window and the reference window obtained by scanning the reference window and second reliability based on a shape of the peaks; and output means for outputting a value of the reliability of the parallax together with a value of the parallax.

6. A computer-readable storage medium having stored thereon, a computer program for controlling a stereo-image processing apparatus for measuring parallax by making a stereo-correspondence search between a base image taken with a first imaging device and a reference image taken with a second imaging device, allowing the stereo-image processing apparatus to execute the steps of:

setting a specified area of a base window with reference to an object point for obtaining a corresponding point in the base image;

setting a reference window having the same size as that of the base window in the reference image;

evaluating a difference between patterns of the base window and the reference window while scanning the reference window along an epipolar line in the reference image which corresponds to the object point;

determining a position of the reference window having a minimum difference as a stereo corresponding point;

measuring the parallax by a difference between a position of the base window and a position of the reference window when the stereo-corresponding point is determined;

calculating the reliability of the parallax by first reliability based on a sharpness of a peak of an evaluation-value distribution of the difference of patterns between the base window and the reference window obtained by scanning the reference window and second reliability based on a shape of the peaks; and outputting a value of the reliability of the parallax together with a value of the parallax.

* * * * *